United States Patent
Ray et al.

(10) Patent No.: US 6,456,793 B1
(45) Date of Patent: Sep. 24, 2002

(54) METHOD AND APPARATUS FOR A COLOR SCANNERLESS RANGE IMAGING SYSTEM

(75) Inventors: Lawrence A. Ray; Louis R. Gabello, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 77 days.

(21) Appl. No.: 09/631,601

(22) Filed: Aug. 3, 2000

(51) Int. Cl.[7] .......................... G03B 3/00; G01C 3/08; H01L 31/00
(52) U.S. Cl. .................. 396/89; 356/5.1; 250/214 VT
(58) Field of Search .................. 396/89, 155, 222, 396/311, 429; 356/2, 3, 5.1; 250/214 VT

(56) References Cited

U.S. PATENT DOCUMENTS

| | | | |
|---|---|---|---|
| 4,315,978 A | 2/1982 | Hartman | 430/4 |
| 4,374,325 A | 2/1983 | Howorth | 250/213 |
| 4,935,616 A | 6/1990 | Scott | 250/213 |
| 5,161,008 A | 11/1992 | Funk | 358/44 |
| 5,233,183 A | 8/1993 | Field | 250/214 |
| 5,719,074 A | 2/1998 | Hawkins et al. | 438/70 |
| 5,742,115 A | 4/1998 | Gertsenshteyn | 313/365 |
| 6,088,086 A * | 7/2000 | Muguira et al. | 396/5.15 |
| 6,118,946 A * | 9/2000 | Ray et al. | 396/89 |
| 6,288,776 B1 * | 9/2001 | Cahill et al. | 356/5.1 |

OTHER PUBLICATIONS

U.S. patent application Ser. No. 09/342,370, Ray et al., filed Jun. 29, 1999.
U.S. patent application Ser. No. 09/451,823, Ray et al., filed Nov. 30, 1999.
U.S. patent application Ser. No. 09/572,522, Ray et al., filed May 17, 2000.

"Innovative range imager sees how targets measure up: For smart weapons and civilian uses too" by Ken Frazier. Sandia Lab News, vol. 46, No. 19, Sep. 16, 1994.

* cited by examiner

Primary Examiner—Russell Adams
Assistant Examiner—Arthur A Smith
(74) Attorney, Agent, or Firm—David M. Woods

(57) ABSTRACT

A color scannerless range imaging system includes an illumination system for illuminating the scene with modulated illumination of a predetermined modulation frequency and an image capture section positioned in an optical path of the reflected illumination from the scene for capturing a plurality of images including (a) at least one range image corresponding to the reflected modulated illumination and including a phase delay corresponding to the distance of objects in the scene from the range imaging system, and (b) at least one other image of reflected unmodulated illumination corresponding to color in the scene. The image capture section includes a color filter array arranged with a first type of color filter that preferentially transmits the reflected modulated illumination and one or more other color filters that preferentially transmit the reflected unmodulated illumination, an image intensifier receiving the reflected illumination and including a modulating stage for modulating the reflected modulated illumination from the scene, thereby generating the range information, and an image responsive element for capturing an output of the image intensifier, including the range image and the other image of reflected unmodulated image light corresponding to color in the scene. The image intensifier is structured with channels that generally correspond to the color filter array such that the intensifier provides the range image from channels corresponding to the first color filter and the other image corresponding to color in the scene from channels corresponding to the other color filters.

29 Claims, 6 Drawing Sheets

METHOD AND APPARATUS FOR A COLOR SCANNERLESS RANGE IMAGING SYSTEM

FIELD OF THE INVENTION

The present invention relates to the field of three-dimensional image capture and in particular to the capture of a color texture image in conjunction with a scannerless range imaging system.

BACKGROUND OF THE INVENTION

Standard image capture systems will capture images, such as photographic images, that are two-dimensional representations of the three-dimensional world. In such systems, projective geometry best models the process of transforming the three-dimensional real world into the two-dimensional images. In particular, much of the information that is lost in the transformation is in the distance between the camera and image points in the real world. Methods and processes have been proposed to retrieve or record this information. Some methods, such as one based on a scanner from Cyberware, Inc., use a laser to scan across a scene. Variations in the reflected light are used to estimate the range to the object. However, these methods require the subject to be close (e.g., within 2 meters) to the camera and are typically slow. Stereo imaging is a common example of another process, which is fast on capture but requires solving the "correspondence problem", that is, the problem of finding corresponding points in the two images. This can be difficult and limit the number of pixels having range data, due to a limited number of feature points that are suitable for the correspondence processing.

Another method described in U.S. Pat. No. 4,935,616 (and further described in the Sandia Lab News, vol. 46, No. 19, Sep. 16, 1994) provides a scannerless range imaging system using either an amplitude-modulated high-power laser diode or an array of amplitude-modulated light emitting diodes (LEDs) to completely illuminate a target scene. Conventional optics confine the target beam and image the target onto a receiver, which includes an integrating detector array sensor having hundreds of elements in each dimension. The range to a target is determined by measuring the phase shift of the reflected light from the target relative to the amplitude-modulated carrier phase of the transmitted light. To make this measurement, the gain of an image intensifier (in particular, a micro-channel plate) within the receiver is modulated at the same frequency as the transmitter, so the amount of light reaching the sensor (a charge-coupled device) is a function of the range-dependent phase difference. A second image is then taken without receiver or transmitter modulation and is used to eliminate non-range-carrying intensity information. Both captured images are registered spatially, and a digital processor is used to operate on these two frames to extract range. Consequently, the range associated with each pixel is essentially measured simultaneously across the whole scene.

The preferred method of estimating the range in the '616 patent uses a pair of captured images, one image with a destructive interference caused by modulating the image intensifier, and the other with the image intensifier set at a constant voltage. However, a more stable estimation method uses a series of at least three images, each with modulation applied to the image intensifier, as described in commonly assigned copending application Ser. No. 09/342,370, entitled "Method and Apparatus for Scannerless Range Image Capture Using Photographic Film" and filed Jun. 29, 1999 in the names of Lawrence Allen Ray and Timothy P. Mathers. In that application, the distinguishing feature of each image is that the phase of the image intensifier modulation is unique relative to modulation of the illuminator. If a series of n images are to be collected, then the preferred arrangement is for successive images to have a phase shift of $2\pi/n$ radians (where n is the number of images) from the phase of the previous image. However, this specific shift is not required, albeit the phase shifts need to be unique. The resultant set of images is referred to as an image bundle. The range at a pixel location is estimated by selecting the intensity of the pixel at that location in each image of the bundle and performing a best fit of a sine wave of one period through the points. The phase of the resulting best-fitted sine wave is then used to estimate the range to the object based upon the wave-length of the illumination frequency.

An image intensifier operates by converting photonic energy into a stream of electrons, amplifying the energy of the electrons and then converting the electrons back into photonic energy via a phosphor plate. One consequence of this process is that color information is lost. Since color is a useful property of images for many applications, a means of acquiring the color information that is registered along with the range information is extremely desirable. One approach to acquiring color is to place a dichromatic mirror in the optical path before the microchannel plate. Following the mirror a separate image capture plane (i.e., a separate image sensor) is provided for the range portion of the camera and another image capture plane (another sensor) is provided for the color texture capture portion of the camera. This is the approach taken by 3DV Technology with their Z-Cam product. Besides the added expense of two image capture devices, there are additional drawbacks in the need to register the two image planes precisely, together with alignment of the optical paths. Another difficulty is collating image pairs gathered by different sources.

Another approach is described in detail in commonly assigned copending application Ser. No. 09/572,522, entitled "Method and Apparatus for a Color Scannerless Range Image System" and filed May 17, 2000 in the names of Lawrence Allen Ray and Louis R. Gabello. In this system, a primary optical path is established for directing image light toward a single image responsive element. A beamsplitter located in the primary optical path separates the image light into two channels, a first channel including an infrared component and a second channel including a color texture component. One of the channels continues to traverse the primary optical path and the other channel traverses a secondary optical path distinct from the primary path. A modulating element is operative in the first channel to receive the infrared component and a modulating signal, and to generate a processed infrared component with phase data indicative of range information. An optical network is provided in the secondary optical path for recombining the secondary optical path into the primary optical path such that the processed infrared component and the color texture component are directed toward the single image responsive element. While this approach avoids the added expense of two image capture devices, there continues to be the need to register the two image planes precisely, together with alignment of the optical paths.

Another approach is to capture an image bundle by using two interchangeable optical assemblies: one optical assembly for the phase image portion and a separate optical element for the color texture image portion. This approach is described in detail in commonly assigned copending application Ser. No. 09/451,823, entitled "Method and Apparatus for a Color Scannerless Range Image System"

and filed Nov. 30, 1999 in the names of Lawrence Allen Ray, Louis R. Gabello and Kenneth J. Repich. The drawback of this approach is the need to switch lenses and the possible misregistration that might occur due to the physical exchange of lens elements. There is an additional drawback in the time required to swap the two optical assemblies, and the effect that may have on the spatial coincidence of the images.

A scannerless range imaging camera may operate either as a digital camera or a camera utilizing film. In the case of a film based system there are some other requirements, particularly registration requirements, that need to be met. These requirements and means for satisfying them are described in the aforementioned copending application Ser. No. 09/342,370. As mentioned above, the drawback of such a camera system, including a film-based system, is its inability to capture a color image.

In most conventional digital imaging systems, the ability to determine color is accomplished by means of a color filter array (CFA) arranged in front of the image responsive device, such as a charge-coupled device (CCD). The CFA overcomes the CCD's inherent inability to discriminate color, i.e., the CCD is basically a monochrome device. The manufacturing and use of a CFA is well known, see, e.g., U.S. Pat. No. 4,315,978, entitled "Solid-state color imaging device having a color filter array using a photocrosslinkable barrier". This filter system, which is different from the standard filter in that the filter is an array of small color filters, is employed by a large number of digital cameras, for example the DCS-series of cameras manufactured by Eastman Kodak Company. Typically, the array is comprised of an array of 2×2 pixel sub-filters. The sub-filter blocks have two diagonal cells capable of filtering green light, and one other cell is capable of filtering red light and the third is capable of filtering blue light. Upon completing the image capture a full color pixel is formed by interpolation based upon pixels capturing the desired color. Color filter arrays with more than three primary colors are also known in the art (see, e.g., U.S. Pat. No. 5,719,074, entitled "Method of making a planar color filter array for CCDs from dyed and mordant layers"). In particular, this method allows for filters with any repeatable pattern of color sensitive dyes. Each of these patents are incorporated herein by reference.

It is known, in certain cases, to apply color filters to an image intensifier. In U.S. Pat. No. 4,374,325, entitled "Image intensifier arrangement with an in situ formed output filter", an image intensifier device is provided with color filters on its input and output surfaces so as to intensify a color image without losing the color content. Each filter consists of an array of red, green and blue elements and these elements are precisely aligned in both input and output filters to avoid degradation of the color content. A method of producing the output filter in situ is described to provide the required accuracy of alignment. In U.S. Pat. No. 5,233,183, entitled "Color image intensifier device and method for producing same", a four color system is specified in which a color image intensifier device includes infra-red filters in an RGB input matrix and a narrow band output filter is assigned to represent IR information in the RGB output matrix. In each of these cases, the output image from the intensifier is adapted for human viewing; thus the output image needs to reconverted back to a color image, and hence the need for a second color filter behind the phosphor element at the output of the intensifier. In U.S. Pat. No. 5,161,008, entitled "Optoelectronic image sensor for color cameras", an image sensor includes an image intensifier arranged between an interline type semiconductor sensor, coupled to the output of the intensifier, and a color stripe filter disposed in front of the photocathode such that one color stripe of the color stripe filter is associated with one column of light-sensitive elements of the semiconductor sensor. Each of these patents are incorporated herein by reference.

As mentioned above, the drawback of a range imaging camera system, including a film-based system, is the inability of current designs to capture a color image. What is needed is a convenient camera system that would avoid the aforementioned limitations and capture ranging information without sacrificing color information that would otherwise be available for capture.

SUMMARY OF THE INVENTION

An object of the invention is to obtain a color image along with range information for each point on the image.

A further object is to obtain such a color image by introducing a color filter array prior to the photo-cathode on the microchannel plate in the intensifier, where the color filter array is matched to the spatial pattern of the microchannel plate. Individual cells of the filter array are also arranged to provide a simple means of interpolation.

The present invention is directed to overcoming one or more of the problems set forth above. Briefly summarized, according to one aspect of the invention, a color scannerless range imaging system includes an illumination system for illuminating the scene with modulated illumination of a predetermined modulation frequency and an image capture section positioned in an optical path of the reflected illumination from the scene for capturing a plurality of images thereof, including (a) at least one range image corresponding to the reflected modulated illumination and including a phase delay corresponding to the distance of objects in the scene from the range imaging system, and (b) at least one other image of reflected unmodulated illumination corresponding to color in the scene. The image capture section includes a color filter array arranged with a first type of color filter that preferentially transmits the reflected modulated illumination and one or more other color filters that preferentially transmit the reflected unmodulated illumination, an image intensifier receiving the reflected illumination and including a modulating stage for modulating the reflected modulated illumination from the scene with the predetermined modulation frequency, thereby generating the range information, and an image responsive element for capturing an output of the image intensifier, including the range image corresponding to the reflected modulated image light and the other image of reflected unmodulated image light corresponding to color in the scene. The image intensifier is structured with channels that generally correspond to the color filter array such that the intensifier provides the range image from channels corresponding to the first color filter and the other image corresponding to color in the scene from channels corresponding to the one or more other color filters.

The advantage of this invention is that a single image capture system is required, thereby reducing cost, correlation and image capture variations. Moreover, the combined range and texture image is color instead of monochrome. The system does not require beam-splitters or difficult optical waveguides, and the overall system may be an attachment to a standard camera system

DETAILED DESCRIPTION OF THE INVENTION

Because range imaging devices employing laser illuminators and capture devices including image intensifiers and electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 1:
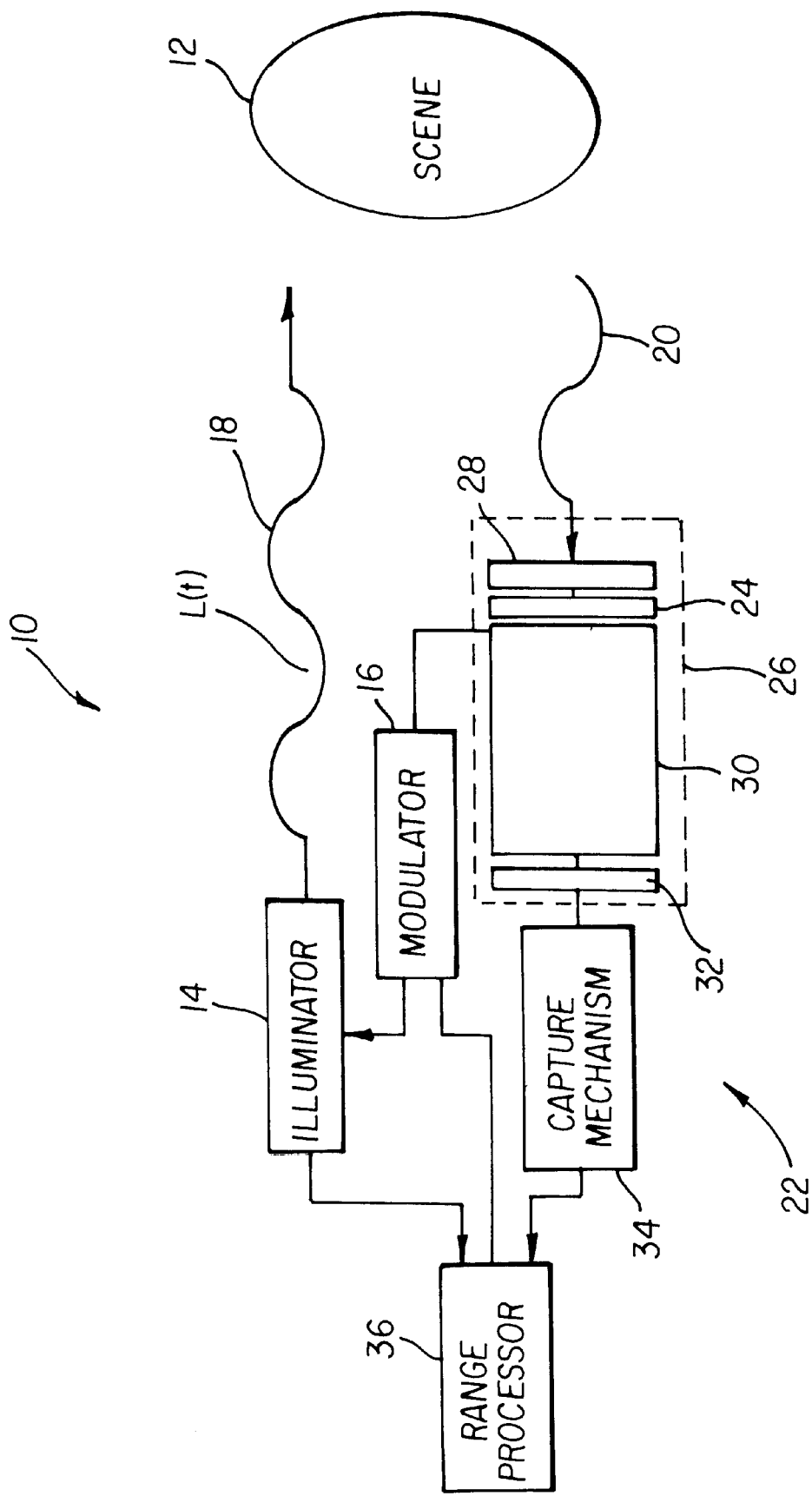
FIG. 1 shows the main components of a color scannerless range imaging system in accordance with the invention.

Referring first to FIG. 1, a color range imaging system 10 is shown as a laser radar that is used to illuminate a scene 12 and then to capture an image bundle comprising a minimum of three images of the scene 12. An illuminator 14 emits a beam of electromagnetic radiation whose frequency is controlled by a modulator 16. Typically the illuminator 14 is a laser device which includes an optical diffuser in order to effect a wide-field illumination. As will be described in greater detail, it is preferable that the modulating laser is an IR source. This is also for eye-safety issues and to operate in the spectral region of maximal response by the capture system. The modulator 16 provides an amplitude varying sinusoidal modulation. The modulated illumination source is modeled by:

$$L(t) = \mu_L + \eta \sin(2\pi\lambda t) \quad \text{(Eq. 1)}$$

where $\mu_L$ is the mean illumination, $\eta$ is the modulus of the illumination source, and $\lambda$ is the modulation frequency applied to the illuminator 14. The modulation frequency is sufficiently high (e.g., 10 MHz) to attain sufficiently accurate range estimates. The output beam 18 is directed toward the scene 12 and a reflected beam 20 is directed back toward a receiving section 22. As is well known, the reflected beam 20 is a delayed version of the transmitted output beam 18, with the amount of phase delay being a function of the distance of the scene 12 from the range imaging system. (Importantly for this invention, the reflected beam 20 will always include unmodulated illumination, for instance, ambient or studio color illumination reflected from objects in the scene. The illuminator 14 may also include a separate light source (not shown) for emitting unmodulated illumination; then the reflected unmodulated illumination from the scene may include at least some of the emitted unmodulated illumination.)

Figure 2A:
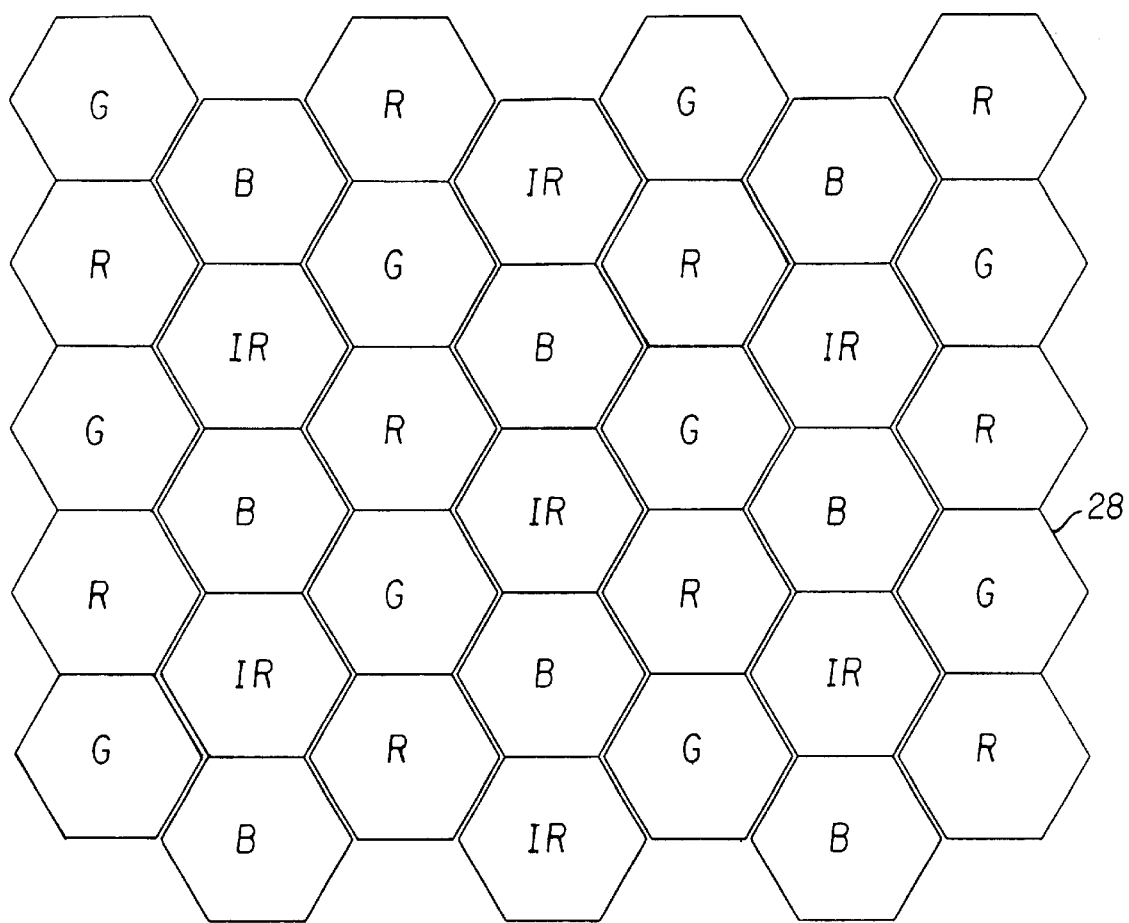
FIGS. 2A and 2B are diagrams of the color filter array used in the system shown in FIG. 1.
Figure 2B:
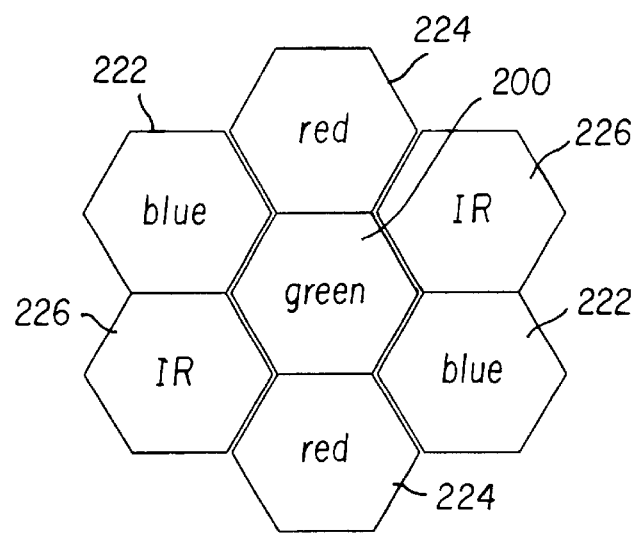

The receiving section 22 includes an image intensifier 26 having a microchannel plate 30, a photocathode 24 on a front, input face of the microchannel plate 30 and a phosphor screen on a rear, output face of the microchannel plate 30. A color filter array 28 is positioned in front of the photocathode 24 in order to provide the intensifier 26 with the capability of producing color images. As is well known, colors of the visible spectrum may be reproduced by combinations of different sets of colors, such as red, green and blue or cyan, magenta and yellow. Moreover, it is well known that the sensitivity of an image intensifier is partly derived from the fact that the photocathode is mostly responsive to near-infrared radiation (400–900 nanometers), part of which is invisible to the human eye. Accordingly, since the advantageous effect of the invention is obtained by confining the range data to the infra-red radiation, the modulation frequency of the illumination is restricted to the infra-red region, and the visible region separated by the color filter array is therefore substantially unaffected by the modulation. Therefore, referring to FIGS. 2A and 2B, the color filter array 28 is shown to comprise a pattern of four distinct color filters, e.g., red, blue, green and infrared filters. As shown in FIG. 2A, the filter 28 is arranged into a hexagonal lattice designed to match the channel pattern of the microchannel plate 28. The red, green and blue channels are designed to limit the amount of light from neighboring bands from passing through the filter. The infrared filter element is intended to pass infrared light, but may also pass red light as well. As shown in FIG. 2B, the arrangement of the color filter elements within the lattice provide an additional desirable property. Given a color filter element 200, the six neighboring elements do not share the same color filtering property, and there are precisely two neighboring color filter elements 222, 224, 226 for each color. For instance, if the given color element 200 is a green color element, then color filter elements 222 could be blue color elements, color filter elements 224 could be red color elements and color filter elements 226 could be infra-red color elements. Each two elements of the same color are thus on directly opposite sides of the central color filter element, which provides a desirable property when it comes to interpolation of the missing colors for each color element, that is, each missing color for a central color filter element may be interpolated from two adjacent color filter elements of the same color.

The reflected beam 20 passes through the color filter array 28 and strikes the photocathode 24 within the image intensifier 26; the infra-red portion of the beam 20 produces a modulated electron stream proportional to the input amplitude variations (hereinafter referred as the IR component), while the red, green and blue portions of the beam 20 produce an electron stream proportional to the red, green and blue content of the scene (hereinafter referred as the color component). Since the photocathode 24 does not separately process the colors in the scene, the electron stream created at this point is essentially monochromatic, i.e., except for its spatial relationship to the color filter array, the color wavelength information in the electron stream is lost at this time. The IR component output of the image intensifier 26 is modeled by:

$$M(t) = \mu_M + \gamma \sin(2\pi\lambda t) \quad \text{(Eq. 2)}$$

where $\mu_M$ is the mean intensification, $\gamma$ is the modulus of the intensification and $\lambda$ is the modulation frequency applied to the intensifier 26. The purpose of the image intensifier is not only to intensify both components of the image, but also to act as a modulating shutter for the IR component. Accordingly, the image intensifier 26 is connected to the modulator 16, such that the electron stream strikes the intensifier 26 and the IR component is modulated by an IR modulating signal from the modulator 16. The electron stream, including both components, is then amplified through secondary emission by the microchannel plate 30. The intensified electron stream bombards a phosphor screen 32, which converts the energy into a visible light image. While the color wavelength information has been lost, the spatial correspondence of the visible light image to the color filter array 28 has been maintained. Some of this visible light image represents (spatially) the color components, and another portion represents the IR component. The intensified light image signal is captured by a capture mechanism 34, such as a charge-coupled device (CCD). The electronic output of the CCD is then separated by conventional processing techniques into the IR component and the several color components (i.e., RGB components). The IR component of the captured image signal is applied to a range processor 36 to determine the phase delay at each point in the scene. The phase delay term ω of an object at a range ρ meters is given by:

$$\omega = \frac{2\rho\lambda}{c} \mod 2\pi \qquad \text{(Eq. 3)}$$

where c is the velocity of light in a vacuum. Consequently, the reflected light at this point is modeled by:

$$R(t) = \mu_L = \kappa \sin(2\pi\lambda t + \omega) \qquad \text{(Eq. 4)}$$

where κ is the modulus of illumination reflected from the object. The pixel response P at this point is an integration of the reflected light and the effect of the intensification:

$$P = \int_0^{2\pi} R(t)M(t)dt = 2\mu_L\mu_M + \kappa\pi\gamma\cos(\omega) \qquad \text{(Eq. 5)}$$

Figure 3:
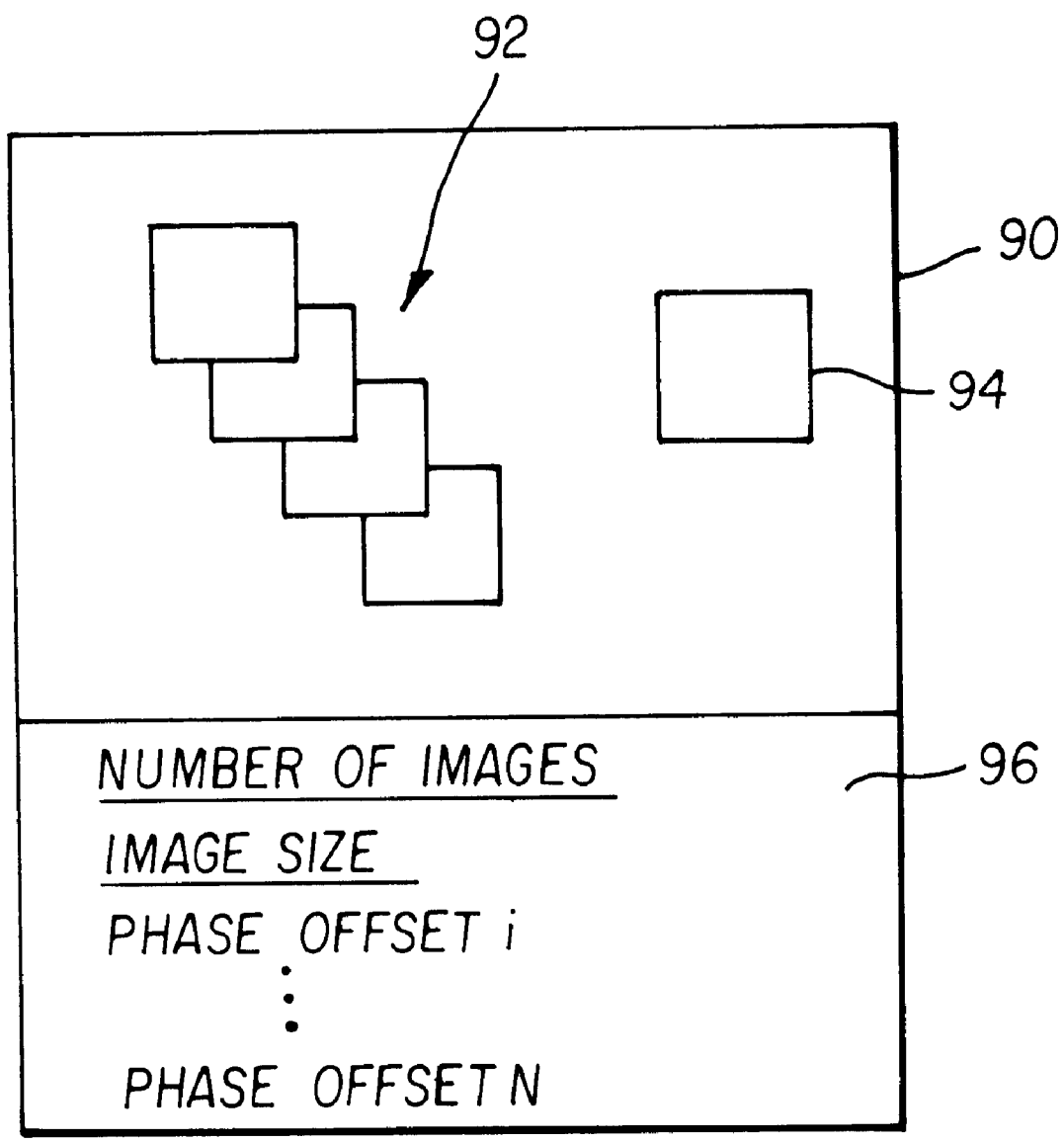
FIG. 3 is a diagram illustrating an image bundle and related data captured by the system shown in FIG. 1.

The improved approach described in the aforementioned Ser. No. 09/342,370, which is incorporated herein by reference, collects at least three phase images (referred to as an image bundle). As shown in relation to FIG. 3, the notion of an image bundle 90 is central to the range estimation method. The image bundle 90 includes a combination of images captured by the system as well as information pertinent to the individual images and information common to all the images. The image bundle contains two types of images: range images 92 related to the IR component portion of the process and a color image 94, commonly referred to as the texture image. Common information 96 in the image bundle 90 would typically include the number of images in the bundle (three or more) and the modulation frequency utilized by the camera system. Other information might be the number of horizontal and vertical pixels in the images, and/or data related to camera status at the time of the image capture. Image specific information will include the phase offset 1...N used for each (1...N) of the individual range images 92. The image bundle 90 includes a minimum of three such images, each of which are monochrome. Each of the range images 92 records the effect of a distinct phase offset applied to either the illuminator 14 or to the image intensifier 26. The additional color image 94 is an image developed from color channels obtained from the red, green and blue color filters, and does not contain range capture components. Although this is a color image, it is preferably, but not necessarily, the same size as the range images 92.

In the present approach, the phase of the intensifier 26 is shifted relative to the phase of the illuminator 14, and each of the phase images has a distinct phase offset. For this purpose, the range processor 36 is suitably connected to control the phase offset of the modulator 16, as well as the average illumination level and such other capture functions as may be necessary. If the image intensifier 26 (or laser illuminator 14) is phase shifted by $\theta_i$, the pixel response from equation (5) becomes:

$$P_i = 2\mu_L\mu_M\pi + \kappa\pi\gamma\cos(\omega + \theta_i) \qquad \text{(Eq. 6)}$$

It is desired to extract the phase term ω from the expression. However, this term is not directly accessible from a single IR component image. In equation (6) there are three unknown values and the form of the equation is quite simple. As a result, mathematically only three samples (from three IR component images) are required to retrieve an estimate of the phase term, which is equivalent to the distance of an object in the scene from the imaging system 10. Therefore, a set of three IR component images captured with unique phase shifts is sufficient to determine ω. For simplicity, the phase shifts are given by $\theta_k = 2\pi k/3; k=0,1,2$. In the following description, an image bundle shall be understood to constitute a collection of IR component images which are of the same scene, but with each image having a distinct phase offset obtained from the modulation applied to the intensifier 26. It should also be understood that an analogous analysis can be performed by phase shifting the illuminator 14 instead of the intensifier 26. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with n≧3 distinct phase offsets of the intensifier (or laser or a combination of both) these images form an image bundle. Applying Equation (6) to each IR component image in the image bundle and expanding the cosine term (i.e., $P_i = 2\mu_L\mu_M\pi + \kappa\pi\gamma(\cos(\omega)\cos(\theta_i) - \sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \qquad \text{(Eq. 7)}$$

where $\Lambda = 2\mu_L\mu_M\pi$, $\Lambda_2 = \kappa\pi\gamma\cos\omega$, and $\Lambda_3 = \kappa\pi\gamma\sin\omega$. This system of equations is solved by a singular value decomposition to yield the vector $\Lambda = [\Lambda_1, \Lambda_2, \Lambda_3]^T$. Since this calculation is carried out at every (x,y) location in the image bundle, Λ is really a vector image containing a three element vector at every point. The phase term ω is computed at each point using a four-quadrant arctangent calculations:

$$\omega = \tan^{-1}(\Lambda_3, \Lambda_2) \qquad \text{(Eq. 8)}$$

The resulting collection of phase values at each point forms the phase image. Once phase has been determined, range r can be calculated by:

$$r = \omega \frac{c}{4\pi\lambda} \quad \text{(Eq. 9)}$$

Equations (1)–(9) thus describe a method of estimating range using an image bundle with at least three images (i.e., n=3) corresponding to distinct phase offsets of the intensifier and/or laser.

Various techniques may be used to manufacture and attach the color filter to an intensifier tube. For instance, in the aforementioned U.S. Pat. No. 5,233,183, which is incorporated herein by reference, the filters are screen printed onto a thin glass substrate, e.g., a wafer, which becomes a glass layer that is sandwiched between a faceplate and the photocathode. In U.S. Pat. No. 4,374,325, which is incorporated herein by reference, an array of colored hexagons or squares are deposited in situ across the surface of a fiber optic plate attached to the photocathode in order to provide the required accuracy of alignment. U.S. Pat. No. 5,742,115, entitled "Color Image Intensifier Device and Method for Producing Same", which is incorporated herein by reference, describes the hexagonal placement (FIG. 2) and alignment of color filters to an intensifier, where the alignment of input (and output) color filters is implemented in the course of the regular procedure of imager intensifier manufacturing. In particular, a faceplate incorporating the color filters is adjusted in an operating tube under visual control until in the correct position all chromatic moire vanish and the correct monochromatic flat field response will appear in the field of vision. Then the various elements are secured in place. Each of these patents also teach the arrangement of a second color filter on the output of the intensifier tube. While the present invention has been described in relation to the location of the color filter on the front of the intensifier, it is to be understood that the color filter could alternatively be placed on the rear of the intensifier. While two color filters are not necessary, it should also be understood that intensifier tubes with color filters on both ends would operate successfully with the present invention. The claims are intended to cover these various arrangements, regardless of their details of construction and manufacture.

As has been described, an intensifier tube comprises a photocathode that converts light into electrons, that are then transferred to a array of channels within the microchannel plate. While passing through the channels, the electrons are amplified. The channels in the array are typically in the arrangement of a honeycomb, e.g., a hexagonal lattice, and are not in spatial alignment with the photosensitive pixel pattern of most CCD imagers. As would be indicated by the teaching of the aforementioned U.S. Pat. No. 5,161,008, an intensifier incorporating a stripe filter may be aligned with a conventional rectilinear two-dimensional semiconductor sensor, and therefore this mis-alignment would not necessarily be a critical matter; nonetheless, it may prove desirable in some situations to provide an imager with a matching lattice of pixels, which could be accomplished with conventional techniques of the kind involved in the manufacture of CCD, or other types of, imagers. Alternatively, this problem may be avoided if the image that is emitted from the microchannel plate can be collected onto monochromatic photographic film. The capture of range data onto photographic film has been disclosed by Ray and Mathers in the aforementioned commonly assigned copending application Ser. No. 09/342,370. One fundamental problem of utilizing film is the need to register the images for use in the range estimation process. Ray and Mathers teach a method to accomplish this task.

Figure 4:
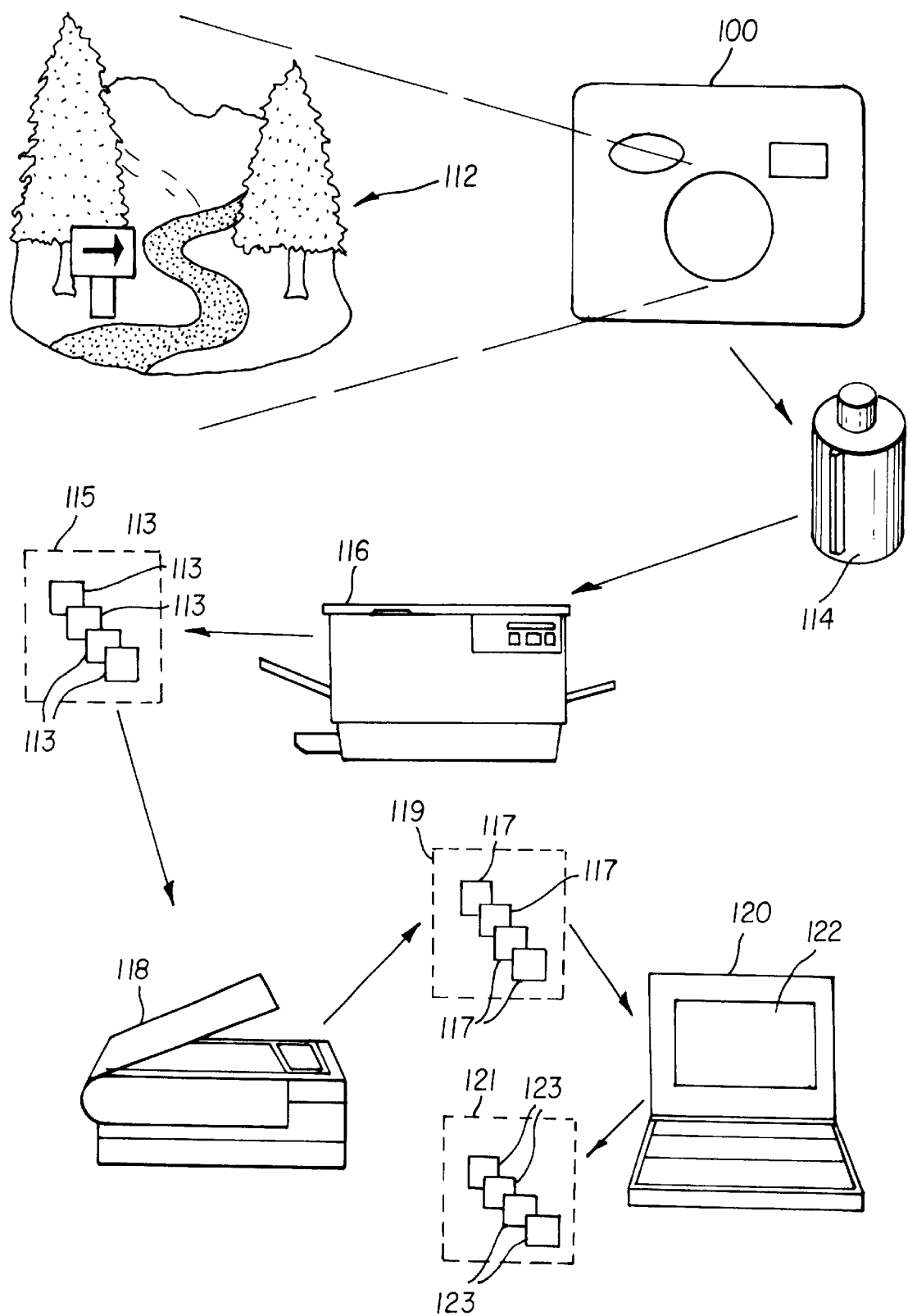
FIG. 4 shows the various stages of a film-based range imaging process in accordance with the invention.

FIG. 4 shows a film-based embodiment of the present invention, including an image capture system 100 that has the ability to emit modulated illumination and to synchronize a receiver with the same frequency through a locked phase offset. This system records the images onto photographic film with a geometric pattern of pixel elements, as described above. The system 100 captures a plurality of images of a scene 112, with a minimum of three of such images. The plurality of images 113, referred to as an image bundle 115, are identical, with the exception that the phase offset provided for the IR component for each image in the image bundle is unique. In addition, the system 100 puts fiducial markings on the film in order to assure image registration later in the range estimation process. The images in the image bundle are recorded on a photographic film 114. While any film will work, it is preferred that a film such as EASTMAN PLUS-X Reversal Film 7276 from Eastman Kodak Company is used. Such a film will provide the overall speed needed for the image capture system, as well as providing excellent material uniformity. The film 114 is then developed in a film development unit 116. Care needs to be taken in order to minimize process non-uniformities in the film development process for successive film frames. The developed film images 113 are then scanned in a scanner 118 and converted into a digital image bundle 119, with each image 117 being scanned using identical scanning characteristics. The digital image bundle 119 is then transferred to an image processing computer 120. The digital image bundle 119 is first registered by aligning the fiducial marks on each image 117. This is accomplished by a standard pattern matching algorithm. The preferred manner is to select one of the digital images 117 in the digital image bundle 119 and register all other images to that image. Once the images are all registered, information regarding the phase offsets of each image and the modulation frequency of the camera 100 illumination system are given to the computer 120 and a registered image bundle 121 results. In addition, a range estimate for each registered pixel is performed and stored as part of the image bundle 121.

Figure 5:
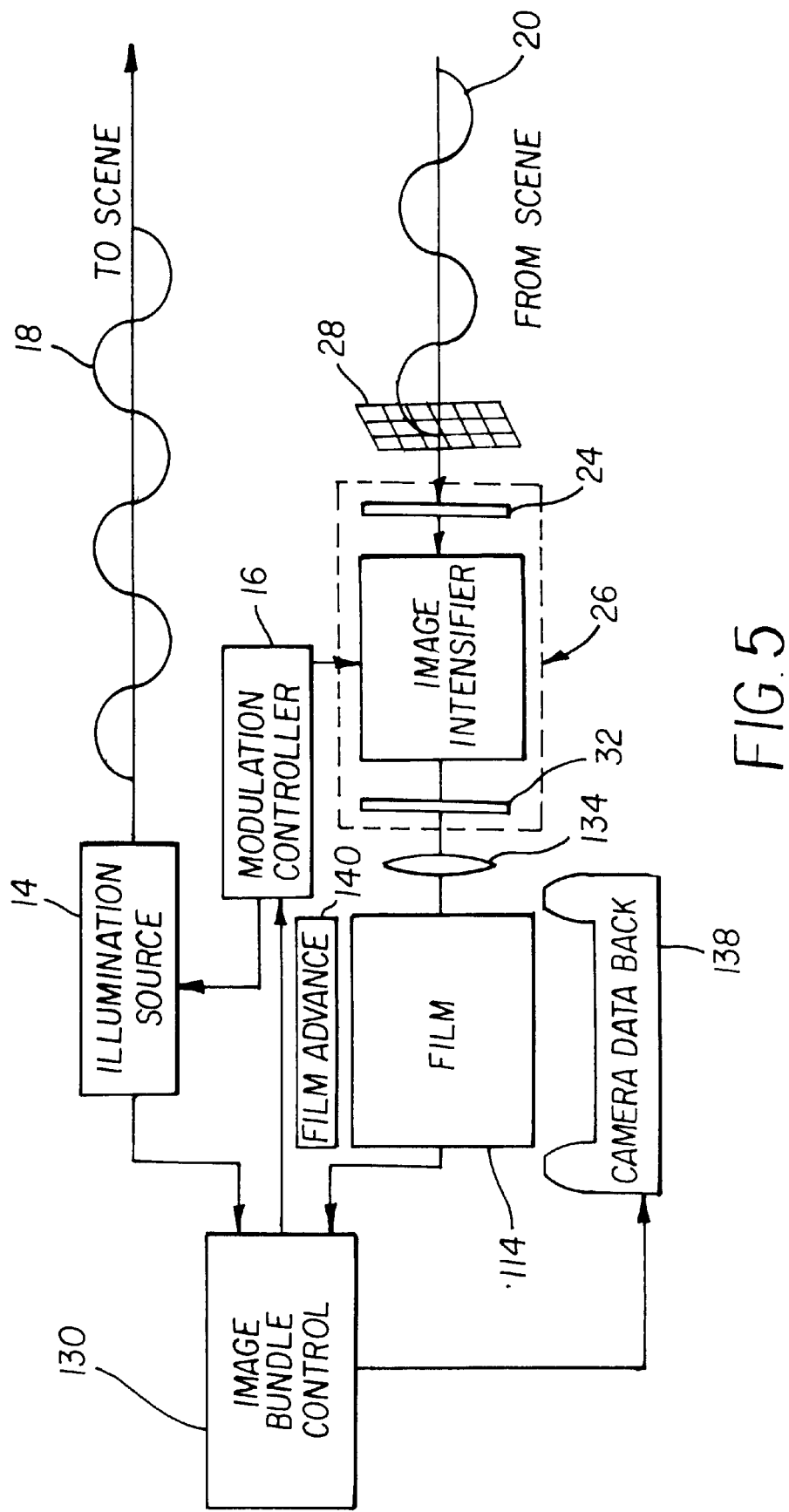
FIG. 5 shows the main components of a film-based color scannerless range imaging system in accordance with the invention.

Referring now to FIG. 5, the camera system 100 is described in further detail, wherein elements common with FIG. 1 are shown with the same reference numeral. The camera system 100 is comprised of a number of subassemblies in addition to the normal assemblies common to most cameras. In particular, the camera has an image bundle control system 130 that manages the camera, including standard camera functions, the average illumination level provided to the film 114, the phase offset of the image intensifier 26, a film advance 140, and a camera data-back 138. The camera data-back 138, such as a Nikon MF-28, is used to write a pattern between the image areas, which is used later to register the images, as described in the aforementioned Ser. No. 09/342,370. As described in connection with FIG. 1, the illuminator 14 provides an illumination source that can be modulated at sufficiently high frequency e.g., 10 mHz to attain sufficiently accurate range estimates. Typically, the illuminator 14 is a laser device that has an optical diffuser in order to affect a wide-field illumination. The illumination does not have to be uniform, but does need to have sufficient intensity to generate a distinguishable reflection. The modulation controller 16 controls the modulation frequency of the illumination source 14 and of the image intensifier 26. Part of the function of the modulation controller 16 is to introduce the appropriate phase delay to the image intensifier 26. The light from the illumination source 14 is reflected from the scene and returned through a standard camera lens (not shown). The light then passes through the color filter array 28. The image intensifier amplifies the returning light and acts as a modulating shutter for the IR component. After passing through the image intensifier 26, the photons bombard a phosphor screen 32 which converts the energy into visible light that is directed by a lens 134 upon the film 114.

Figure 6:
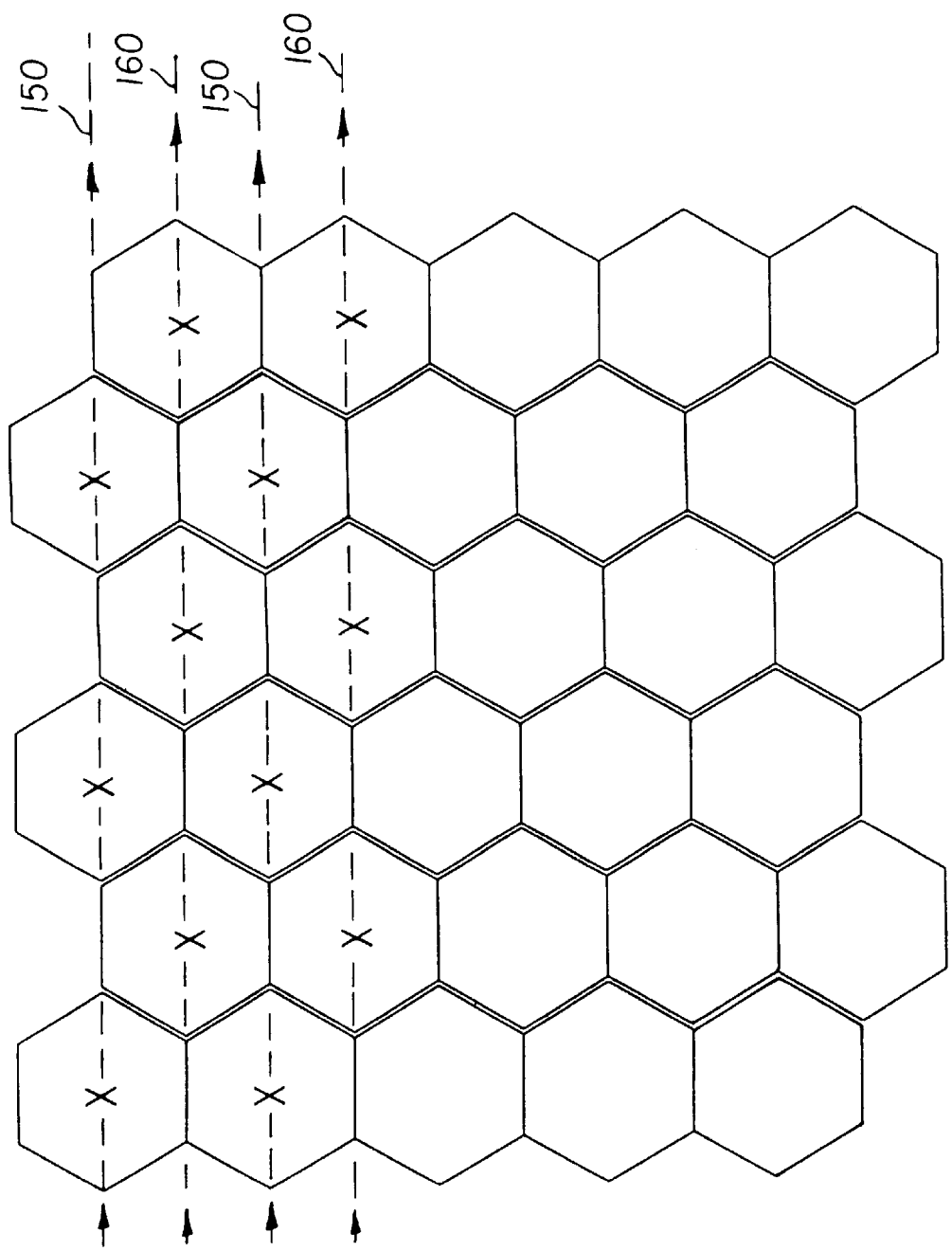
FIG. 6 is a diagram of hexagonal scanning employed with the film-based range imaging process shown in FIG. 4.

As shown in FIGS. 1 and 5, the image capture device can be a high quality monochrome film 114 or a charged-couple device (CCD) 34, preferably with a hexagonal lattice of pixel cells. In the preferred embodiment, the color filter array matches the hexagonal pattern of the microchannel plate; consequently, a hexagonal pattern corresponding spatially to the color filter array is projected upon the image capture device. Thus, the preferred embodiment of the system makes use of this hexagonal lattice of pixels at the image plane. Either the CCD would share this arrangement, or in the case of film, a film scanner would be capable of conducting a hexagonal scan of the film. Most image scanners use a rectilinear lattice to scan an image. However, the regions of the film images that are to be converted into pixel values are structured using a hexagonal lattice. Assuming the scanner has been spatially calibrated, the preferred method of scanning is to perform two separate scans. The reason for this is that the hexagonal lattice can be readily decomposed into two rectilinear lattices. Each rectilinear lattice is scanned and the results are then interleaved in the obvious manner to recover the hexagonal lattice. FIG. 6 shows a form of hexagonal scanning based on two rectilinear scans, one scan represented by the scanning line 150 and the other scan by a scanning line 160, that may be used to obtain the range and texture image from the film. The "x" points in the figure describe the hexagonal sampling patterns employed by the two scans. Further details regarding hexagonal scanning can be found in "The Processing of Hexagonally Sampled Two-Dimensional Signals", by R. M. Mersereau, *Proceedings of the IEEE*, vol. 67, no. 8, June 1979, pp. 930–949. There is also the potential for variation in where the image is captured onto film, and where the scanner anticipates the image position on the film there is a need to calibrate the scanner position based upon the fiducial marks written on the film. This method was described by Ray and Mathers in the aforementioned Ser. No. 09/342,370.

The technique of interpolating the pixels of the resulting image can be understood in relation to FIG. 2B. The collected image has by itself no color information, since the preferred embodiment utilizes a CCD or black and white film and more importantly because the electrons emitted from the microchannel plate bombard a phosphor screen that provides no color differentiation. However, because of the pattern of the color filter array as projected on the CCD or film, color can be inferred at individual points on the image plane. The scanned cells from the film or the CCD elements are mapped to the color of the filter array element projected upon them. This is the same basic premise as used by current digital cameras. Knowledge of the current cell's color filter element and the arrangement of the CFA hexagonal pattern shown in FIG. 2B determines the pattern of color filter elements of neighboring cells. For instance, a red pixel has two neighboring green pixels, two neighboring blue pixels and two neighboring infrared pixels. The position of these colors relative to the central pixel is uniform. The pixels of the same color are also arranged to be diagonally opposite. As a result, one method of estimating the missing color values is a simple average of the two opposing pixels of the same color. Accordingly, the result is that each captured image includes four "color" bands or channels, e.g., red, green, blue and IR channels.

The invention has been described in detail with particular reference to certain preferred embodiments thereof, but it will be understood that variations and modifications can be effected within the spirit and scope of the invention.

| PARTS LIST | |
|---|---|
| 10 | range imaging system |
| 12 | scene |
| 14 | illuminator |
| 16 | modulator |
| 18 | output beam |
| 20 | reflected beam |
| 22 | receiving section |
| 24 | photocathode |
| 26 | image intensifier |
| 28 | color filter array |
| 30 | microchannel plate |
| 32 | phosphor screen |
| 34 | capture mechanism |
| 36 | range processor |
| 90 | image bundle |
| 92 | range images |
| 94 | color image |
| 96 | common information |
| 100 | image capture system |
| 112 | scene |
| 113 | image |
| 114 | photographic film |
| 115 | image bundle |
| 116 | development unit |
| 117 | image |
| 118 | scanner |
| 119 | digital image bundle |
| 120 | image processing computer |
| 121 | registered image bundle |
| 122 | image display |
| 123 | image |
| 130 | image bundle control system |
| 134 | lens |
| 138 | camera data back |
| 140 | film advance |
| 200 | color filter element |
| 222 | color filter element |
| 224 | color filter element |
| 226 | color filter element |

What is claimed is:

1. A color scannerless range imaging system for capturing both color and range information of a scene, said system comprising;

an illumination system for controllably illuminating the scene with modulated illumination of a predetermined modulation frequency, whereby some of the modulated illumination is reflected from objects in the scene;

an image capture section positioned in an optical path of the reflected illumination from the scene for capturing a plurality of images thereof, including (a) at least one range image corresponding to the reflected modulated illumination, whereby the modulation of the reflected modulated illumination incorporates a phase delay corresponding to the distance of objects in the scene from the range imaging system, and (b) at least one other image of reflected unmodulated illumination corresponding to color in the scene, said image capture section comprising:

a color filter array positioned in the optical path of the reflected illumination and comprised of a predetermined filter pattern including a first color filter that preferentially transmits the reflected modulated illumination and one or more other color filters that preferentially transmit the reflected unmodulated illumination;

an image intensifier receiving the reflected illumination and including a modulating stage for modulating the reflected modulated illumination from the scene with the predetermined modulation frequency, thereby generating the range information, wherein the image intensifier has a channel structure that generally corresponds to the predetermined pattern of the color filter array such that the intensifier provides the range image from channels corresponding to said first color filter and the other image corresponding to color in the scene from channels corresponding to said one or more other color filters; and an image responsive element for capturing an output of the image intensifier, including the range image corresponding to the reflected modulated image light and the other image of reflected unmodulated image light corresponding to color in the scene.

2. The range imaging system as claimed in claim 1 wherein the intensifier is a micro-channel plate.

3. The range imaging system as claimed in claim 1 wherein the image intensifier is interposed in the optical path between the image responsive element and the color filter array.

4. The range imaging system as claimed in claim 1 wherein the image responsive element is a photosensitive film.

5. The range imaging system as claimed in claim 1 wherein the image responsive element is an electronic image sensor.

6. The range imaging system as claimed in claim 1 farther comprising means for storing the color and range images as a bundle of associated images.

7. The range imaging system as claimed in claim 1 wherein the image responsive element captures a plurality of range images corresponding to the reflected modulated illumination, wherein each range image incorporates the effect of the predetermined modulation frequency together with a phase offset unique for each image.

8. The range imaging system as claimed in claim 7 wherein each unique phase offset θ is given by $\theta_i=2\pi i/3; i=0,1,2$.

9. The range imaging system as claimed in claim 1 wherein the illumination system includes a laser illuminator for producing the modulated illumination.

10. The range imaging system as claimed in claim 1 wherein the predetermined modulating frequency is an infra-red frequency and said first color filter is an infra-red color filter.

11. The range imaging system as claimed in claim 1 wherein said one or more other color filters comprise a set of color filters including at least any two filters selected from the group of red, green and blue filters.

12. The range imaging system as claimed in claim 1 wherein the illumination system also emits unmodulated illumination and the reflected unmodulated illumination includes at least some of the emitted unmodulated illumination.

13. The range imaging system as claimed in claim 1 wherein the reflected unmodulated illumination includes ambient illumination reflected from objects in the scene.

14. The range imaging system as claimed in claim 2 wherein the microchannel plate includes channels forming a hexagonal lattice structure and the color filter array has a hexagonal pattern that substantially matches the lattice structure of the microchannel plate.

15. A color scannerless range imaging system for capturing both color and range information of a scene, said system comprising;

an illumination system for controllably illuminating the scene with modulated illumination of a predetermined modulation frequency, whereby some of the modulated illumination is reflected from objects in the scene;

an image capture section positioned in an optical path of the reflected illumination from the scene for capturing a plurality of images thereof, including (a) at least one range image corresponding to the reflected modulated illumination, whereby the modulation of the reflected modulated illumination incorporates a phase delay corresponding to the distance of objects in the scene from the range imaging system, and (b) at least one other image of reflected unmodulated illumination corresponding to color in the scene, said image capture section comprising:

a color filter array positioned in the optical path of the reflected illumination and comprised of a predetermined filter pattern including a first color filter that preferentially transmits the reflected modulated illumination and one or more other color filters that preferentially transmit the reflected unmodulated illumination;

an image intensifier receiving the reflected illumination and including a modulating stage for modulating the reflected modulated illumination from the scene with the predetermined modulation frequency, thereby generating the range information, wherein the image intensifier has a channel structure that generally corresponds to the predetermined pattern of the color filter array such that the intensifier provides the range image from channels corresponding to said first color filter and the other image corresponding to color in the scene from channels corresponding to said one or more other color filters;

an image responsive element for capturing an output representing the output image plane of the image intensifier, including the range image corresponding to the reflected modulated image light and the other image of reflected unmodulated image light corresponding to color in the scene; and a range processor for processing the captured output image to infer color information from the spatial coordinates of the individual points on the output image plane.

16. The range imaging system as claimed in claim 15 wherein the intensifier is a micro-channel plate.

17. The range imaging system as claimed in claim 15 wherein the image intensifier is interposed in the optical path between the image responsive element and the color filter array.

18. The range imaging system as claimed in claim 15 wherein the image responsive element is a photosensitive film.

19. The range imaging system as claimed in claim 15 wherein the image responsive element is an electronic image sensor.

20. The range imaging system as claimed in claim 15 further comprising means for storing the color and range images as a bundle of associated images.

21. The range imaging system as claimed in claim 15 wherein the image responsive element captures a plurality of range images corresponding to the reflected modulated illumination, wherein each range image incorporates the effect of the predetermined modulation frequency together with a phase offset unique for each image.

22. The range imaging system as claimed in claim 21 wherein each unique phase offset θ is given by $\theta_i=2\pi i/3; i=0,1,2$.

23. The range imaging system as claimed in claim 15 wherein the illumination system includes a laser illuminator for producing the modulated illumination.

24. The range imaging system as claimed in claim 15 wherein the predetermined modulating frequency is an infra-red frequency and said first color filter is an infra-red color filter.

25. The range imaging system as claimed in claim 15 wherein said one or more other color filters comprise a set of color filters including at least any two filters selected from the group of red, green and blue filters.

26. The range imaging system as claimed in claim 15 wherein the illumination system also emits unmodulated illumination and the reflected unmodulated illumination includes at least some of the emitted unmodulated illumination.

27. The range imaging system as claimed in claim 15 wherein the reflected unmodulated illumination includes ambient illumination reflected from objects in the scene.

28. The range imaging system as claimed in claim 16 wherein the microchannel plate includes channels forming a hexagonal lattice structure and the color filter array has a hexagonal pattern that substantially matches the lattice structure of the microchannel plate.

29. The range imaging system as claimed in claim 28 wherein the range processor operates on the hexagonal pattern to interpolate color from the output of the image intensifier.

\* \* \* \* \*